(12) United States Patent
Jasperse et al.

(10) Patent No.: US 6,286,876 B1
(45) Date of Patent: Sep. 11, 2001

(54) INSULATED FLEXIBLE DUCT FOR AIRCRAFT APPLICATIONS

(75) Inventors: Douglas Scott Jasperse, Grand Rapids; Ralph LeRoy Gooch, Plainwell; Roderick K. Ward, Hastings, all of MI (US)

(73) Assignee: Flexfab Horizons International, Inc., Hastings, MI (US)

( * ) Notice: Subject to any disclaimer, the term of this patent is extended or adjusted under 35 U.S.C. 154(b) by 0 days.

(21) Appl. No.: 09/248,431

(22) Filed: Feb. 11, 1999

Related U.S. Application Data

(60) Provisional application No. 60/074,623, filed on Feb. 13, 1998.

(51) Int. Cl.⁷ .................................................. F16L 31/00
(52) U.S. Cl. ............................ 285/260; 138/156; 24/400; 285/243; 285/42
(58) Field of Search .................................... 138/156, 171; 24/400, 399, 422; 285/260, 243, 42, 222.1, 222.2, 222.3, 222.4, 222.5

(56) References Cited

U.S. PATENT DOCUMENTS

| | | | |
|---|---|---|---|
| 2,522,072 | * 9/1950 | Tierney | 138/156 |
| 3,399,545 | 9/1968 | Anderson et al. | |
| 4,367,889 | * 1/1983 | Redi | 285/222.2 |
| 4,446,181 | * 5/1984 | Wood | 428/36.1 |
| 4,576,666 | * 3/1986 | Harris et al. | 156/85 |
| 4,632,019 | 12/1986 | Whiteman | |
| 4,835,977 | 6/1989 | Haglund et al. | |
| 4,901,538 | 2/1990 | Anthony | |
| 5,358,012 | * 10/1994 | Kish | 138/109 |
| 5,368,341 | 11/1994 | Larson | |
| 5,477,887 | * 12/1995 | Catallo | 137/72 |
| 5,859,385 | * 1/1999 | Nicolai | 174/93 |
| 5,947,158 | * 9/1999 | Gross et al. | 138/156 |

OTHER PUBLICATIONS

Jones, Douglas W; Jones on Sewing for Bookbinding, "Sewing the Sections to a Cover" [online]. University of Iowa [Retrieved on Jan. 12, 2000 @ 10:53 a.m. EST] Retrieved from the Internet: <http://www.cs.uiowa.edu/~jones/book/sew.html>.*

Manual for Singer 221k Featherweight (Part Three) [online]. Retrieved Jan. 12, 2001 @ 11:00 a.m. EST. Retrieved from the Internet:<http://www.demon.co.uk/quinn/manuals/221k/index3.html.*

Advertisement flyer for the LRLPCA Hose by AirTech, Inc., Jamaica, New York.

* cited by examiner

*Primary Examiner*—Lynne H. Browne
*Assistant Examiner*—Aaron M. Dunwoody

(57) ABSTRACT

A hose for delivery of pre-conditioned air between a ground-based heating-ventilating unit and an internal ventilation system of an aircraft comprising at least two hose segments. The hose segments can have an end provided with a fastener interconnectable with a fastener on an end of an adjacent hose segment. Each hose segment can also have an exterior layer formed of a single piece of flexible material wherein opposing longitudinal sides of the piece of material are joined at a single longitudinal seam. Further, at least one protective flap can be located adjacent the fastener on one hose segment and adapted to cover the adjacent fastener and an interconnected fastener when the at least two hose segments are connected to each other.

30 Claims, 3 Drawing Sheets

INSULATED FLEXIBLE DUCT FOR AIRCRAFT APPLICATIONS

CROSS-REFERENCE TO RELATED APPLICATIONS

This application claims the benefit of U.S. Provisional Application No. 60/074,623, filed on Feb. 13, 1998.

BACKGROUND OF THE INVENTION

1. Field of the Invention

The invention relates generally to interconnectable, insulated flexible ventilation ducts. More specifically, the invention relates to preconditioned air ducts.

2. Related Art

During the time an aircraft is located adjacent to an airport gate, preconditioned air can be transported to the aircraft from a ground-based heating or air conditioning system. This is done through the use of insulated flexible duct which connects the heating or air conditioning unit of the airport with the internal ventilation system of the aircraft.

These ducts have been manufactured with various materials and in varying lengths to accommodate different types of aircraft. They are typically formed of several segments connected together through releasable connections. Depending upon the type of the aircraft being serviced, it is necessary to add or delete segments of the duct to establish a suitable and appropriate connection of the aircraft ventilation system with the ground-based unit. The releasable connections can comprise zippers or hook and loop fasteners, such as VELCRO®. An example of a duct assembly employing hook and loop fasteners to interconnect adjacent segments of the ducts shown in U.S. Pat. No. 5,368,341 (Larson), issued Nov. 29, 1994.

The need exists for more durable ventilation duct, given the harsh rigors of its typical use on airport ramps, along with a need for a greater degree of protection for the insulation and for the connections.

SUMMARY OF THE INVENTION

The invention relates to a hose for delivery of preconditioned air between a ground-based heating-ventilating unit and an internal ventilation system of an aircraft. The hose includes at least two hose segments, each hose segment having at least one end provided with a fastener interconnectable with a fastener on an end of an adjacent hose segment. Also, each hose segment has an exterior layer formed of a single piece of flexible material wherein opposing longitudinal sides of the piece of material are joined at a single longitudinal seam. In one aspect of the invention, the fasteners at each end of adjacent hose segments each comprise a rank of teeth, one of the fasteners also having a zipper slide, so that adjacent ranks of teeth are interconnectable by movement of the zipper slide.

In another aspect of the invention, an insulation layer is disposed inwardly of the exterior layer and the insulation layer comprises a closed cell foam material. The insulation layer is preferably bonded to the exterior layer with a hot-melt adhesive.

In another aspect of the invention, the exterior layer is formed from an abrasion-resistant material. The exterior layer is preferably vinyl or coated nylon.

In a further aspect of the invention at least one protective flap is located adjacent the fastener on one hose segment, adapted to cover the fastener and an interconnected fastener when a pair of hose segments are connected to each other.

In a further embodiment, the invention relates to a hose for delivery of preconditioned air between a ground-based heating-ventilating unit and an internal ventilation system of an aircraft. The hose includes at least two hose segments, each hose segment having at least one end provided with a fastener interconnectable with a fastener on an end of an adjacent hose segment. At least two protective flaps, separate from the fastener on one hose segment, are positioned and adapted to cooperate with each other to conceal interconnected fasteners when the at least two hose segments are connected to each other.

In one aspect of this embodiment, the at least two protective flaps cooperate to surround the periphery of the hose. In another aspect, the two protective flaps each have a hook or a loop portion of a hook and loop fastener. The hose segment and the adjacent hose segment have the other portion of a hook and a loop fastener. Thus, the hook and loop fasteners can be interengaged to retain the protective flap against the hose segment or the adjacent hose segment. Preferably, the hook and loop fastener is provided on an interior surface of the two protective flaps.

In yet another aspect of this embodiment of the invention, the interior surface of one protective flap is connected to the exterior surface of an adjacent protective flap by a hook and a loop fastener to fasten the protective flaps to one another.

A further aspect of this embodiment has the protective flaps joined together around the periphery of the hose. Further, each hose segment preferably has an exterior layer formed of a single piece of flexible material wherein opposing longitudinal sides of the piece of material are joined at a single longitudinal seam. The longitudinal sides are joined by welding to form the single seam or, alternatively, by stitching to form the single seam.

In another aspect of this invention, the fasteners at each end of adjacent hose segments each comprise a rank of teeth. One of the fasteners also has a zipper slide, so that adjacent ranks of teeth are interconnectable by movement of the zipper slide. Yet further, each hose segment has an exterior layer with an insulation layer disposed inwardly of the exterior layer. The insulation layer preferably comprises a closed cell foam material. Typically, the insulation layer is bonded to the exterior layer.

The exterior layer is preferably formed from an abrasion-resistant material, either vinyl or coated nylon.

In a further embodiment, the invention relates to a hose for delivery of pre-conditioned air between a ground-based heating-ventilating unit and an internal ventilation system of an aircraft. The hose includes at least two hose segments, each hose segment having at least one end provided with a fastener interconnectable with a fastener on an end of an adjacent hose segment. One protective flap is located on one hose segment and is adapted to cover interconnected fasteners when two hose segments are connected to each other. The protective flap is retained against the hose segment or an adjacent hose segment by a hook and a loop fastener. Also, one protective flap has a pair of opposed ends each of which can be secured to an adjacent protective flap by a hook and a loop fastener, preferably around the periphery of the hose.

In a further embodiment, the invention relates to a hose for delivery of pre-conditioned air between a ground-based heating-ventilating unit and an internal ventilation system of an aircraft. The hose includes at least two hose segments, each hose segment having at least one end provided with a fastener interconnectable with a fastener on an end of an adjacent hose segment. At least one protective flap is located on one hose segment, adapted to cover interconnected fasteners when two hose segments are connected to each other. The fasteners at each end of adjacent hose segments each comprise a rank of teeth, one of the fasteners also having a zipper slide, so that adjacent ranks of teeth are interconnectable by movement of the zipper slide.

BRIEF DESCRIPTION OF THE DRAWINGS

The invention will now be described with reference to the drawings in which.

DETAILED DESCRIPTION

Figure 1:
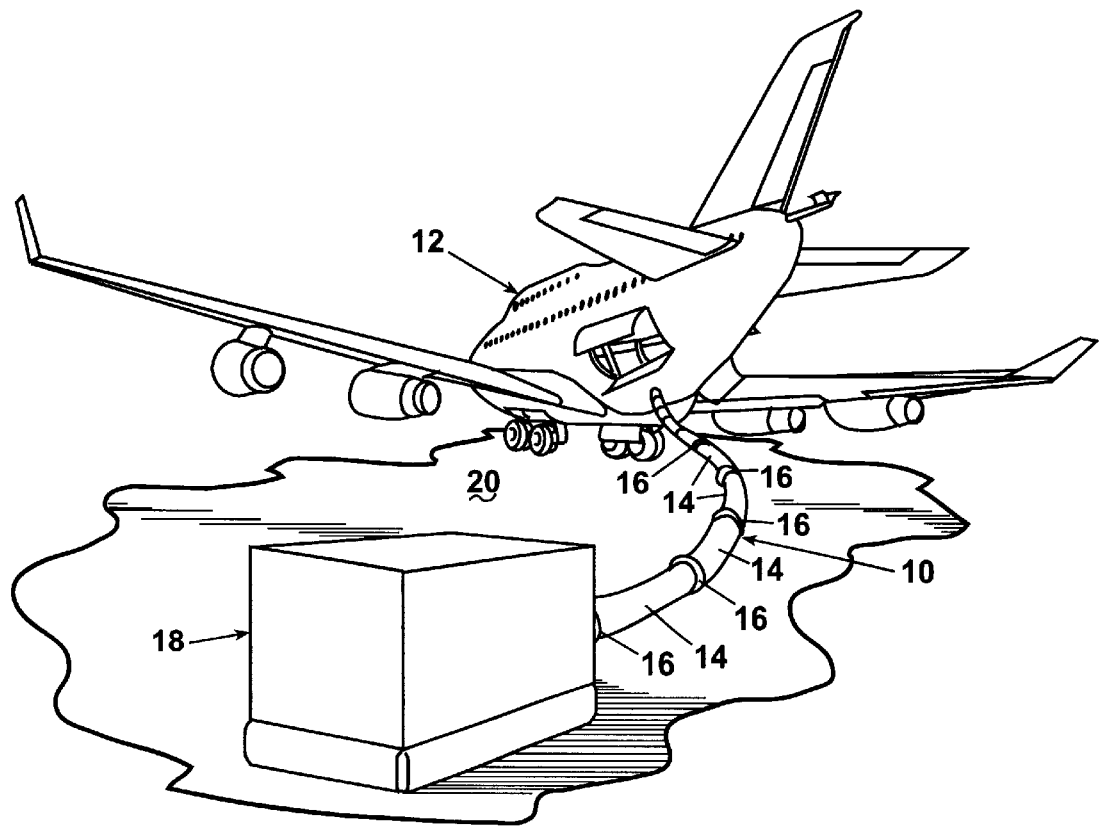
FIG. 1 is a perspective view showing the air duct according to the invention shown extending between an airport terminal ventilation system and an aircraft.

Turning to the drawings and to FIG. 1 in particular, a preconditioned air duct 10 for an aircraft 12 is shown comprising several interconnected segments 14, the ends of which are serially joined together by closure connections 16. It is understood that the number of segments actually needed will vary depending on a number of factors such as the size of the aircraft and the proximity of the aircraft to the gate. For this invention, it is assumed that at least two segments will be needed. The size of each segment is limited by its manual transportability and the ease with which it can be stored, unstored and connected to adjacent segments. When the duct segments 14 are assembled, preconditioned air can be carried from a ventilating system 18 typically located within an airport to an internal ventilating system (not shown) of the aircraft 12 on a ground surface 20 before the aircraft 12 is ready for takeoff. Interconnection of the internal ventilation system of the aircraft 12 to the ventilating system 18 on the ground 20 allows the internal ventilation system of the aircraft 12 to cease generation and delivery of preconditioned air to any occupants of the aircraft 12 permitting the aircraft engines to be shut down. Rather, the preconditioned air is supplied from the ventilating system 18 of the airport.

Each duct segment 14 has an exterior sheath manufactured from a vinyl material, such as coated nylon, which affords optimum strength and flexibility in all types of weather conditions and temperatures. Each segment 14 is formed from a single rectangular length of the duct material joined along opposing longitudinal sides 22 thereof by a welded or stitched interconnection forming a longitudinal seam 24. The seam 24 is preferably welded to provide maximum tear-resistance and prevent the escape of any preconditioned air carried within the duct 10. An insulation layer is disposed adjacent to the exterior sheath, preferably formed of closed cell foam to minimize water absorption. The duct 10 is flexible, especially radially, to permit deformation of the duct 10 while ground vehicles are driven over the duct 10 without permanent damage thereto.

Figure 2:
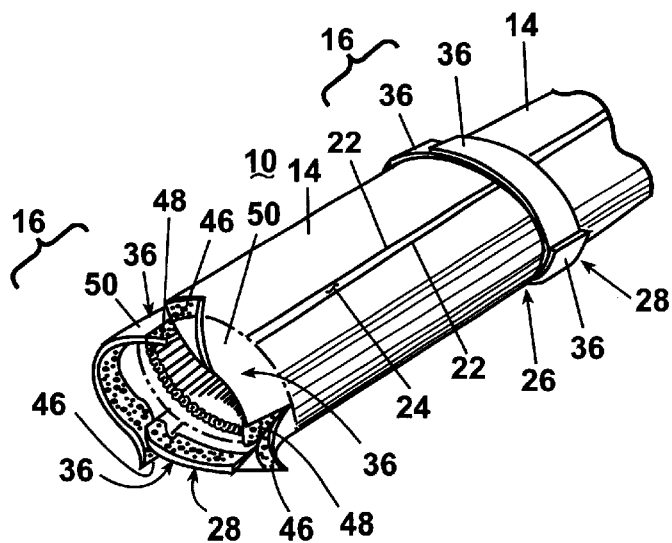
FIG. 2 is a fragmentary perspective view of interconnected segments of the duct of FIG. 1.
Figure 3:
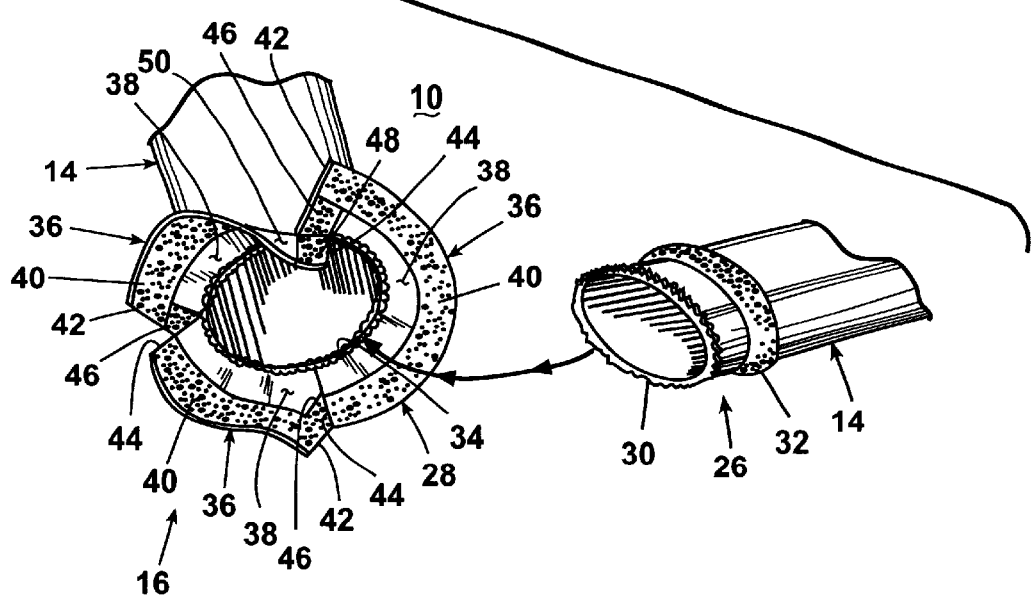
FIG. 3 is an exploded perspective view showing adjacent segments of the duct of FIG. 1 with arrows showing the interconnection of the ends of the adjacent segments.

Looking now at FIGS. 2 and 3, each segment 14 has a first end 26 and a second end 28. The first and second ends 26 and 28 each carry closure connections 16 which enable a second end 28 of an adjacent segment 14 to be interconnected to the first end 26 of another segment 14 of the duct 10.

The first end 26 of each segment 14 includes a first portion 30 of a zipper used for interconnecting adjacent segments 14 of the duct 10 which preferably extends substantially around the circumference of the first end 26. A first portion 32 of a hook and loop fastener, such as VELCRO®, is located adjacent to the first portion 30 of the zipper and preferably axially inwardly thereof.

The second end 28 of each segment 14 includes a second portion 34 of the zipper which is adapted to interconnect with the first portion 30 of the zipper on the first end 26 of the segment 14. The second end 28 of the segment 14 is also provided with several flexible flaps 36 extending axially outwardly of the second portion 34 of the zipper.

Each flap 36 includes an interior surface 38 provided with a transversely-extending second portion 40 of the hook and loop fastener that is adapted to removably engage the first portion 32 of the hook and loop fastener on the first end 26 of an adjacent segment 14.

Each flap 36 also includes a first end 42 and a second end 44. The first end 42 of each flap 36 has a first portion 46 of a hook and loop fastener provided on the interior surface 38 of the flap 36. The second end 44 of each flap 36 is provided with a second portion of a hook and loop fastener on an exterior surface 50 of the flap 36.

The flaps 36 are preferably formed as circumferential extensions of the second end 28 of the segment 14 whereby a first end 42 of one flap 36 is adapted to overlap a second end 44 of an adjacent flap 36. The first portion 46 of the hook and loop fastener on the first end 42 of one flap thereby overlaps and engages the second portion 48 of the hook and loop fastener located on the second end 44 of an adjacent flap 36 as shown in the drawings.

Although three flaps 36 are shown in the drawings, it will be understood that additional or fewer flaps 36 can be provided to the second end 28 of the segment 14 without departing from the scope of this invention.

Figure 4:
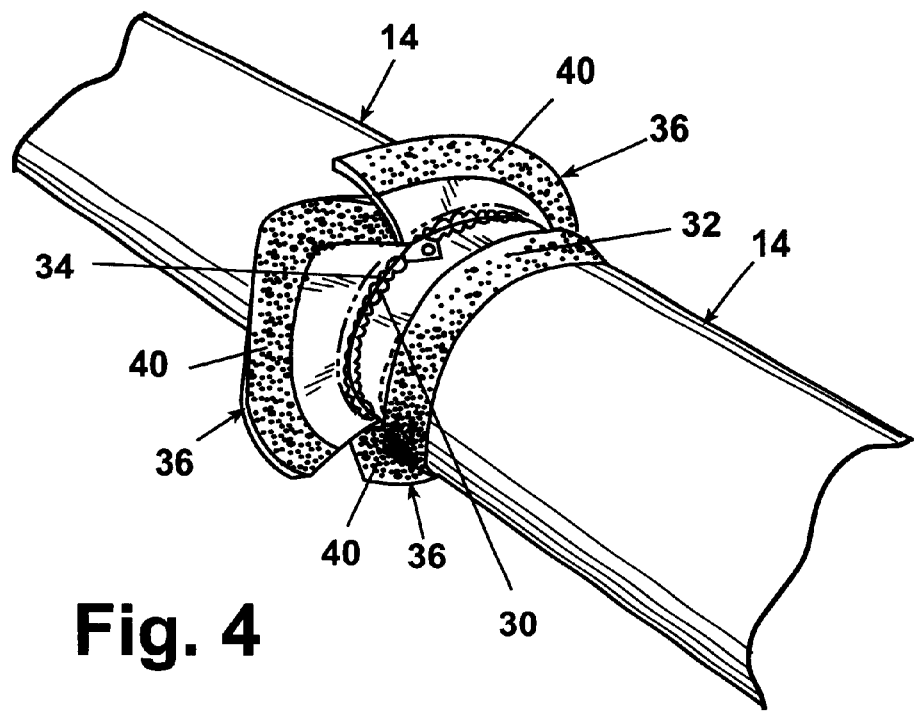
FIG. 4 is a perspective view showing a first stage of interconnection between the ends of the two adjacent segments of FIG. 3.
Figure 5:
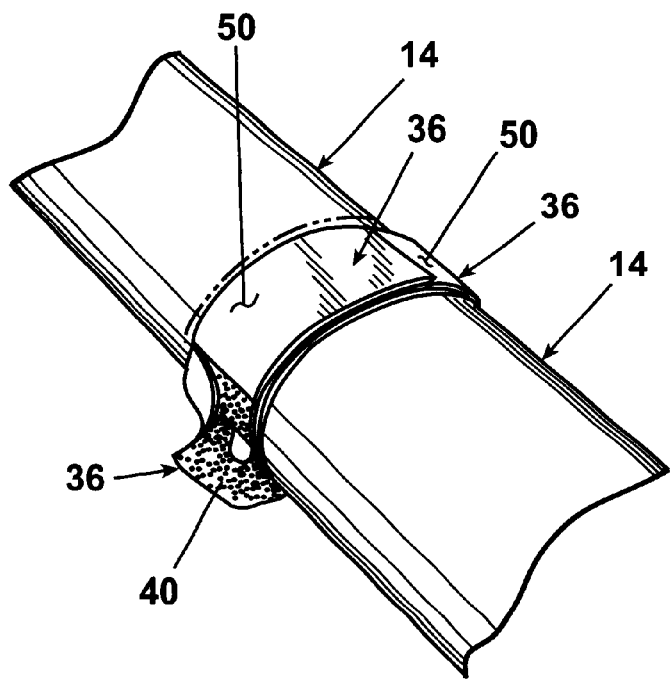
FIG. 5 is a perspective view showing a nearly complete interconnection between the ends of the adjacent duct segments of FIG. 4.

In assembly, the first end 26 of one segment 14 is brought adjacent to the second end 28 of an adjacent segment 14 as shown in FIG. 4. The first portion 30 of the zipper on the first end 26 of one segment 14 is engaged with the second portion 34 of the zipper on the second end 28 of the other segment 14. The zipper is then circumferentially traversed so that the first and second portions 30 and 34 thereof are interengaged. Thus, the primary function of the zipper, and specifically the first and second portions 30 and 34 thereof, is to securely interconnect the first and second ends 26 and 28 of adjacent duct segments 14.

The flaps 36 located on the second end 28 of the segment 14 have the primary purpose of providing a protective cover to prevent environmental elements from damaging the first and second portions 30 and 34 of the zipper. Once the first and second portions 30 and 34 of the zipper on adjacent segments 14 are interengaged, the flaps 36 on the second end 28 on one segment 14 can be folded toward the first end 26 on the adjacent segment 14 so that the second portion 40 of the hook and loop fastener located on the interior surface 38 of each flap 36 overlaps and engages the first portion 32 of the hook and loop fastener located on the first end 26 of the adjacent segment 14. The flaps 36 thereby enclose the first and second portions 30 and 34 of the zipper.

The first portion 46 of the hook and loop fastener located on the first end 42 of each flap 36 can also be engaged with the second portion 48 of the hook and loop fastener located on the second end 44 of the adjacent flap 36 so that each of the flaps 36 are engaged with a successive and a preceding flap 36 as well as with the first end 26 of the adjacent segment 14. Thus, the interengagement of each of the successive and preceding flaps 36 in connection with the engagement of each flap 36 with the first end 26 of the adjacent segment 14 forms an impermeable enclosure for the first and second portions 30 and 34 of the zipper.

It will be understood that the seam 24, in addition to comprising conventional stitching, is preferably welded whereby the material on one longitudinal side 22 of the rectangular piece of duct material is bonded with the material on the other longitudinal side 22 of the piece. It has been found that the welded seam has greater strength than conventional stitch seams as well as not being subject to unraveling due to abrasion, such as when the duct 10 is dragged across the ground surface 20 during use.

It has also been found that coupling the first and second ends 26 and 28 of adjacent segments 14 of the duct 10 with a zipper eliminates decoupling of the adjacent segments 14 during use. Further, covering the first and second portions 30 and 34 of the zipper with the flaps 36 keeps the first and second portions 30 and 34 of the zipper clean and easy to operate even in inclement weather conditions. Engagement of the flaps 36 with the first end 26 of an adjacent segment 14 as well as with immediately preceding and succeeding flaps 36 provides a secure protective cover to the first and second portions 30 and 34 of the zipper.

The foam insulation is preferably bonded to the outer ply of waterproof fabric with a well known bonding agent such as a hot melt adhesive. Thus, the duct 10 is lightweight while preventing preconditioned air from escaping from within the duct 10 or between the interconnection between the first and second ends 26 and 28 of adjoining segments 14.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A hose for delivery of pre-conditioned air between a ground-based heating-ventilating unit and an internal ventilation system of an aircraft, comprising:
   (a) at least two hose segments, each hose segment having at least one end provided with a fastener interconnectable with a fastener on an end of an adjacent hose segment;
   (b) each hose segment having an exterior layer formed of a single piece of flexible material wherein opposing longitudinal sides of the piece of material are joined at a single longitudinal seam; and
   an insulation layer disposed inwardly of the exterior layer, the insulation layer comprising a closed cell foam material,
   wherein the insulation layer is bonded to the exterior layer.

2. The hose of claim 1 wherein the insulation layer is bonded to the exterior layer with a hot melt adhesive.

3. A hose for delivery of pre-conditioned air between a ground-based heating-ventilating unit and an internal ventilation system of an aircraft, comprising:
   (a) at least two hose segments, each hose segment having at least one end provided with a fastener interconnectable with a fastener on an end of an adjacent hose segment; and
   (b) each hose segment having an exterior layer formed of a single piece of flexible material wherein opposing longitudinal sides of the piece of material are joined at a single longitudinal seam,
   wherein the exterior layer is formed from an abrasion-resistant material.

4. The hose of claim 3 wherein the exterior layer is vinyl.

5. The hose of claim 3 wherein the exterior layer is coated nylon.

6. A hose for delivery of pre-conditioned air between a ground-based heating-ventilating unit and an internal ventilation system of an aircraft, comprising:
   (a) at least two hose segments, each hose segment having at least one end provided with a fastener interconnectable with a fastener on an end of an adjacent hose segment; and
   (b) each hose segment having an exterior layer formed of a single piece of flexible material wherein opposing longitudinal sides of the piece of material are joined at a single longitudinal seam,
   wherein the exterior layer is vinyl.

7. A hose for delivery of pre-conditioned air between a ground-based heating-ventilating unit and an internal ventilation system of an aircraft, comprising:
   (a) at least two hose segments, each hose segment having at least one end provided with a fastener interconnectable with a fastener on an end of an adjacent hose segment; and
   (b) each hose segment having an exterior layer formed of a single piece of flexible material wherein opposing longitudinal sides of the piece of material are joined at a single longitudinal seam,
   wherein the exterior layer is coated nylon.

8. A hose for delivery of pre-conditioned air between a ground-based heating-ventilating unit and an internal ventilation system of an aircraft, comprising:
   (a) at least two hose segments, each hose segment having at least one end provided with a fastener interconnectable with a fastener on an end of an adjacent hose segment;
   (b) each hose segment having an exterior layer formed of a single piece of flexible material wherein opposing longitudinal sides of the piece of material are joined at a single longitudinal seam; and
   (c) at least one protective flap located adjacent the fastener on one hose segment, adapted to cover the fastener and an interconnected fastener when a pair of hose segments are connected to each other.

9. A hose for delivery of pre-conditioned air between a ground-based heating-ventilating unit and an internal ventilation system of an aircraft, comprising:
   (a) at least two hose segments, each hose segment having at least one end provided with a fastener interconnectable with a fastener on an end of an adjacent hose segment; and
   (b) at least two protective flaps separate from the fastener on one hose segment, positioned and adapted to cooperate with each other to conceal interconnected fasteners when the at least two hose segments are connected to each other.

10. The hose of claim 9 wherein the at least two protective flaps cooperate to surround the periphery of the hose.

11. The hose of claim 10 wherein the at least two protective flaps each have one of a hook and a loop fastener, one of the hose segment and an adjacent hose segment has the other of a hook and a loop fastener, whereby the hook and loop fasteners can be interengaged to retain the protective flap against the one of the hose segment and the adjacent hose segment.

12. The hose of claim 11 wherein the one of a hook and a loop fastener is provided on an interior surface of the at least two protective flaps.

13. The hose of claim 12 wherein the at least two protective flaps each has a pair of opposed ends and an exterior surface, wherein the exterior surface of each protective flap is provided with the other of the one of a hook and a loop fastener adjacent one end, whereby the one of a hook and a loop fastener provided on the interior surface of each flap can be interengaged with the other of a hook and a loop fastener on the exterior surface of an adjacent protective flap to fasten the protective flaps to one another.

14. The hose of claim 9 wherein the at least two protective flaps have one of a hook and a loop fastener, and one of the hose segment and an adjacent hose segment has the other of a hook and a loop fastener, whereby the hook and loop fasteners can be interengaged to retain the at least two protective flaps against the one of the hose segment and the adjacent hose segment.

15. The hose of claim 14 wherein the at least two protective flaps have a pair of opposed ends and an exterior surface, wherein the exterior surface of the protective flaps are provided with the other of the one of a hook and a loop fastener adjacent one end, whereby the one of a hook and a loop fastener provided on the protective flaps can be interengaged with the other of a hook and a loop fastener on the exterior surface to fasten the protective flaps together around the periphery of the hose.

16. The hose of claim 9 wherein each hose segment has an exterior layer formed of a single piece of flexible material wherein opposing longitudinal sides of the piece of material are joined at a single longitudinal seam.

17. The hose of claim 16 wherein the longitudinal sides are joined by welding to form the single seam.

18. The hose of claim 16 wherein the longitudinal sides are joined by stitching to form the single seam.

19. The hose of claim 9 herein the fasteners at each end of adjacent hose segments each comprise a rank of teeth, one of the fasteners also having a zipper slide, whereby adjacent ranks of teeth are interconnectable by movement of the zipper slide.

20. The hose of claim 9 wherein each hose segment has an exterior layer and further comprising an insulation layer disposed inwardly of the exterior layer.

21. The hose of claim 20 wherein the insulation layer comprises a closed cell foam material.

22. The hose of claim 21 wherein the insulation layer is bonded to the exterior layer.

23. The hose of claim 20 wherein the insulation layer is bonded to the exterior layer.

24. The hose of claim 19 wherein the each hose segment further comprises an exterior layer formed from an abrasion-resistant material.

25. The hose of claim 24 wherein the exterior layer is vinyl.

26. The hose of claim 24 wherein the exterior layer is coated nylon.

27. A hose for delivery of pre-conditioned air between a ground-based heating-ventilating unit and an internal ventilation system of an aircraft, comprising:

at least two hose segments, each hose segment having at least one end provided with a fastener interconnectable with a fastener on an end of an adjacent hose segment;

each hose segment having an exterior layer formed of a single piece of flexible material wherein opposing longitudinal sides of the piece of material are joined at a single longitudinal seam; and the fasteners at each end of adjacent hose segments comprising a rank of teeth, one of the fasteners also having a zipper slide, whereby adjacent ranks of teeth are interconnectable by movement of the zipper slide.

28. A hose for delivery of pre-conditioned air between a ground-based heating-ventilating unit and an internal ventilation system of an aircraft, comprising:

at least two hose segments, each hose segment having at least one end provided with a fastener interconnectable with a fastener on an end of an adjacent hose segment;

each hose segment having an exterior layer formed of a single piece of flexible material wherein opposing longitudinal sides of the piece of material are joined at a single longitudinal seam; and the hose further comprising at least one protective flap located on one hose segment, adapted to cover interconnected fasteners when a pair of hose segments are connected to each other.

29. A hose for delivery of pre-conditioned air between a ground-based heating-ventilating unit and an internal ventilation system of an aircraft, comprising:

at least two hose segments, each hose segment having at least one end provided with a fastener interconnectable with a fastener on an end of an adjacent hose segment;

at least one protective flap located on one hose segment, adapted to cover interconnected fasteners when the at least two hose segments are connected to each other;

at least one protective flap having one of a hook and a loop fastener, one of the hose segment and an adjacent hose segment having the other of a hook and a loop fastener, whereby the hook and loop fasteners can be interengaged to retain the protective flap against the one of the hose segment and the adjacent hose segment; and at least one protective flap having a pair of opposed ends and an exterior surface, wherein the exterior surface of the protective flap is provided with the other of the one of a hook and a loop fastener adjacent one end, whereby the one of a hook and a loop fastener provided on the protective flap can be interengaged with the other of a hook and a loop fastener on the exterior surface to fasten the protective flap to itself around the periphery of the hose.

30. A hose for delivery of pre-conditioned air between a ground-based heating-ventilating unit and an internal ventilation system of an aircraft, comprising:

at least two hose segments, each hose segment having at least one end provided with a fastener interconnectable with a fastener on an end of an adjacent hose segment;

at least one protective flap located on one hose segment, adapted to cover interconnected fasteners when the at least two hose segments are connected to each other; and the fasteners at each end of adjacent hose segments comprise a rank of teeth, one of the fasteners also having a zipper slide, whereby adjacent ranks of teeth are interconnectable by movement of the zipper slide.

* * * * *

UNITED STATES PATENT AND TRADEMARK OFFICE
CERTIFICATE OF CORRECTION

PATENT NO. : 6,286,876 B1
DATED : September 11, 2001
INVENTOR(S) : Douglas Scott Jasperse et al.

It is certified that error appears in the above-identified patent and that said Letters Patent is hereby corrected as shown below:

Column 7,
Line 41, "herein" should be -- wherein --.
Line 55, "claim 19" should be -- claim 9 --.

Signed and Sealed this

Sixth Day of August, 2002

Attest:

Attesting Officer

JAMES E. ROGAN
Director of the United States Patent and Trademark Office